(12) United States Patent  
Zelazowski

(10) Patent No.: US 7,600,870 B2
(45) Date of Patent: Oct. 13, 2009

(54) ATTACHABLE MAGNETIC EYEGLASSES AND METHOD OF MAKING SAME

(75) Inventor: Dennis G. Zelazowski, Lower Burrell, PA (US)

(73) Assignee: Eyenovate, Inc., Lower Burrell, PA (US)

( * ) Notice: Subject to any disclaimer, the term of this patent is extended or adjusted under 35 U.S.C. 154(b) by 314 days.

(21) Appl. No.: 11/458,239

(22) Filed: Jul. 18, 2006

(65) Prior Publication Data

US 2007/0013863 A1    Jan. 18, 2007

Related U.S. Application Data

(60) Provisional application No. 60/700,171, filed on Jul. 18, 2005.

(51) Int. Cl.
G02C 9/00 (2006.01)
(52) U.S. Cl. .......................................... 351/47; 351/57
(58) Field of Classification Search .................. 351/47, 351/48, 57, 58, 44, 41, 158
See application file for complete search history.

(56) References Cited

U.S. PATENT DOCUMENTS

| | | | |
|---|---|---|---|
| 5,416,537 A | 5/1995 | Sadler | |
| 5,936,700 A | 8/1999 | Masunaga | |
| 6,293,671 B1 | 9/2001 | Masunaga | |
| 6,464,352 B1 | 10/2002 | Xie | |
| 6,478,420 B2 | 11/2002 | Xiang | |
| 6,502,939 B2 | 1/2003 | Vignato | |
| 6,533,411 B1 | 3/2003 | Chen et al. | |
| 6,550,913 B2 | 4/2003 | Zelman | |
| 6,655,799 B1 | 12/2003 | Chen | |
| 6,755,522 B1 | 6/2004 | Strenk | |
| 6,883,912 B1 | 4/2005 | Madison | |
| 7,011,402 B2 * | 3/2006 | Shapiro | 351/57 |
| 2001/0055091 A1 | 12/2001 | Vignato | |
| 2002/0047984 A1 | 4/2002 | Tang | |
| 2002/0080325 A1 | 6/2002 | Xiang | |
| 2002/0089639 A1 | 7/2002 | Starner et al. | |
| 2002/0131012 A1 | 9/2002 | Tsai | |
| 2003/0197830 A1 | 10/2003 | Taniguchi | |
| 2004/0114096 A1 | 6/2004 | Strenk | |
| 2005/0001976 A1 | 1/2005 | Yinkai et al. | |
| 2005/0206836 A1 | 9/2005 | Shapiro | |

FOREIGN PATENT DOCUMENTS

CA    2490955    6/2005

* cited by examiner

*Primary Examiner*—Hung X Dang
(74) *Attorney, Agent, or Firm*—Alicia M. Passerin, Esq.; Cohen & Grigsby, P.C.

(57) ABSTRACT

A supplemental lens unit is used on or in combination with a pair of eyeglasses. Lens unit comprises a bridge having at least one prong on each of two ends. Two supplemental lenses are connected by holes positioned near a nasal portion thereof through which prongs protrude. At least one magnet is positioned in peripheral cavities drilled into primary and supplemental lenses. Magnets in each supplemental lens and the corresponding primary lens are of opposite polarity such that lenses are magnetically and removably attached. An example of a method of manufacturing the supplemental lens unit is also disclosed.

27 Claims, 11 Drawing Sheets

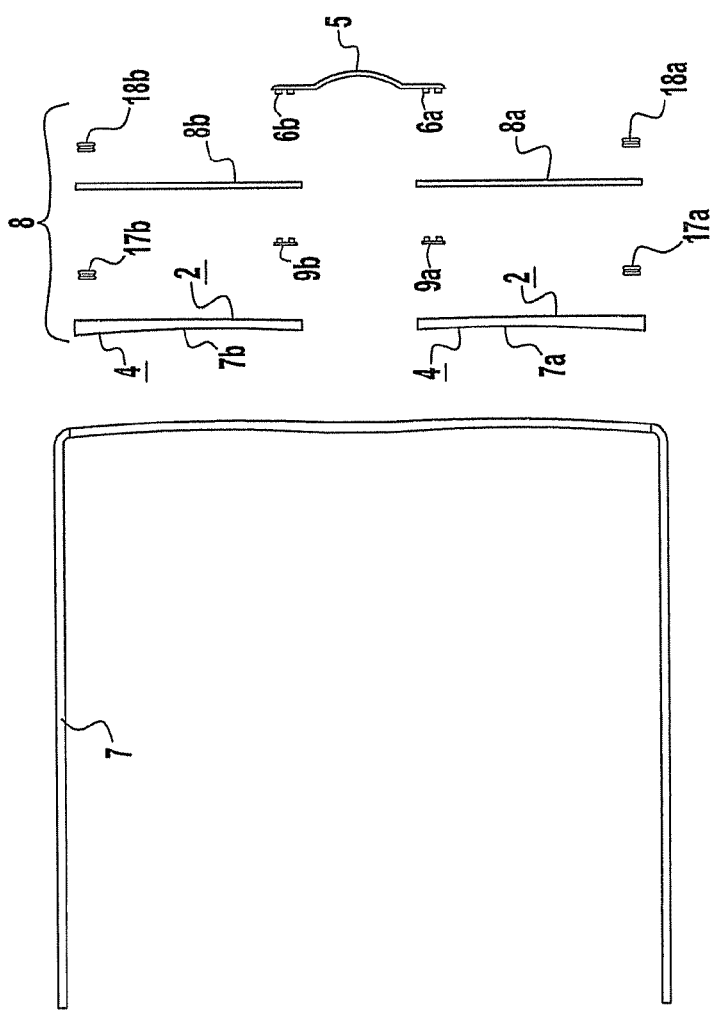
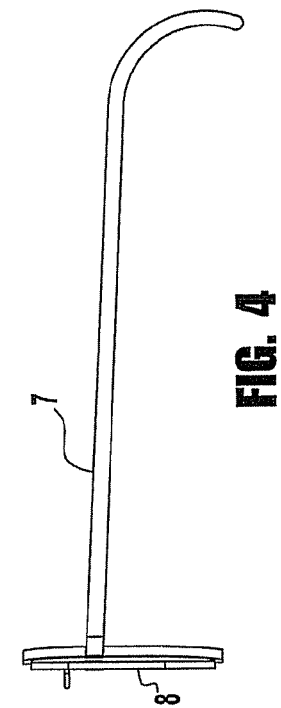
FIG. 4
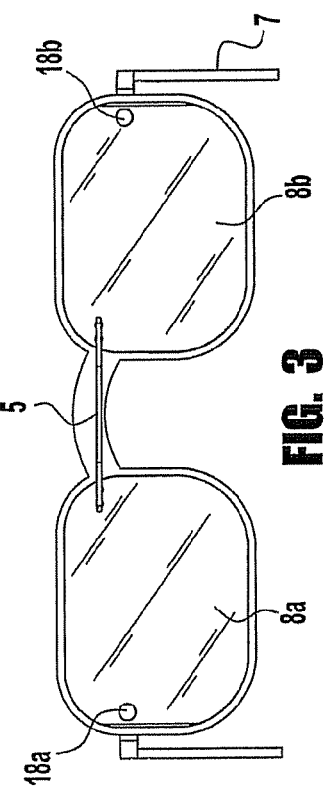
FIG. 6
FIG. 3

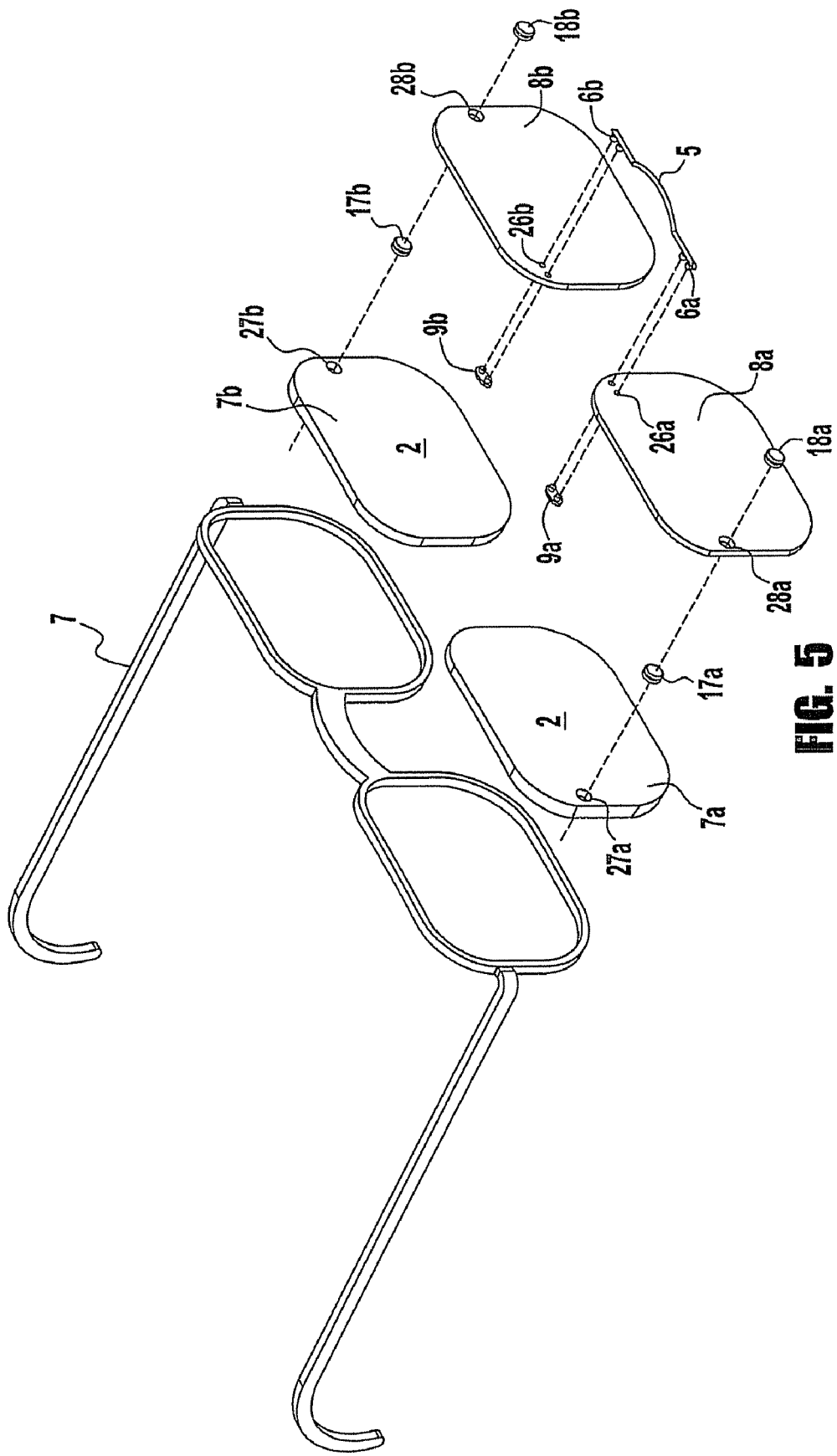

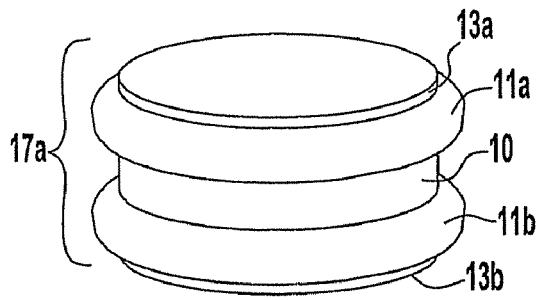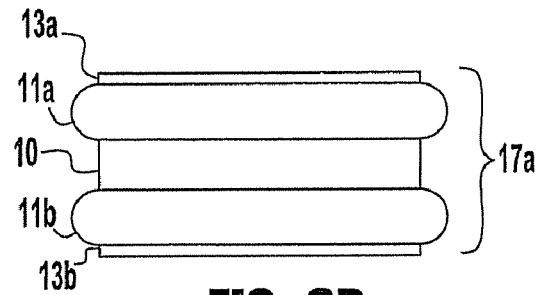
FIG. 8A  FIG. 8B
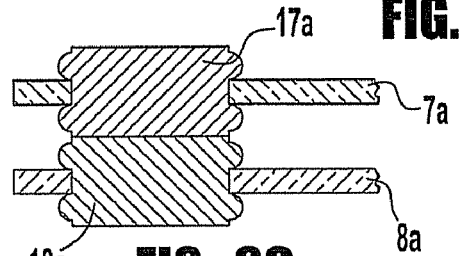
FIG. 8C
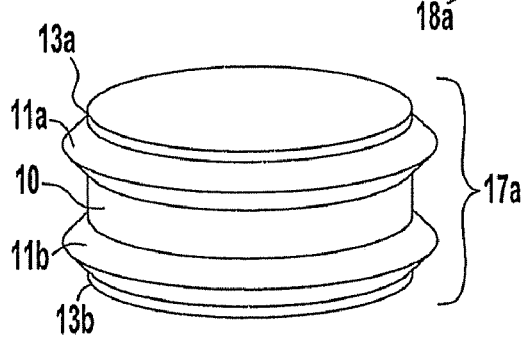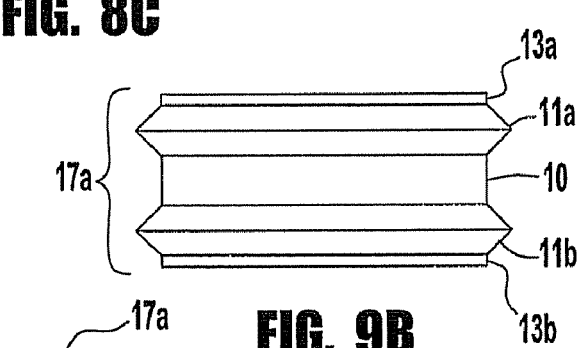
FIG. 9A  FIG. 9B
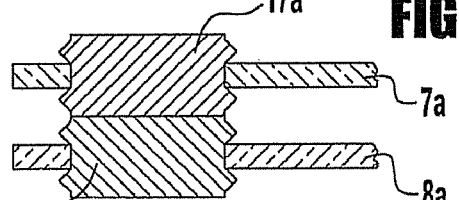
FIG. 9C
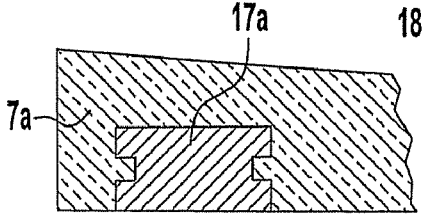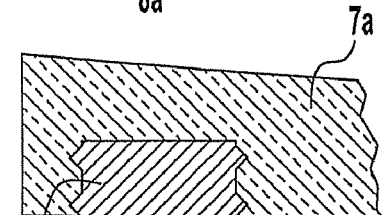
FIG. 10A  FIG. 10B
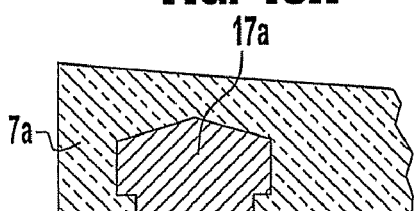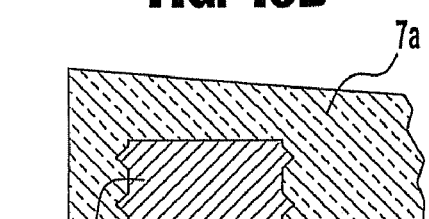
FIG. 10C  FIG. 10D

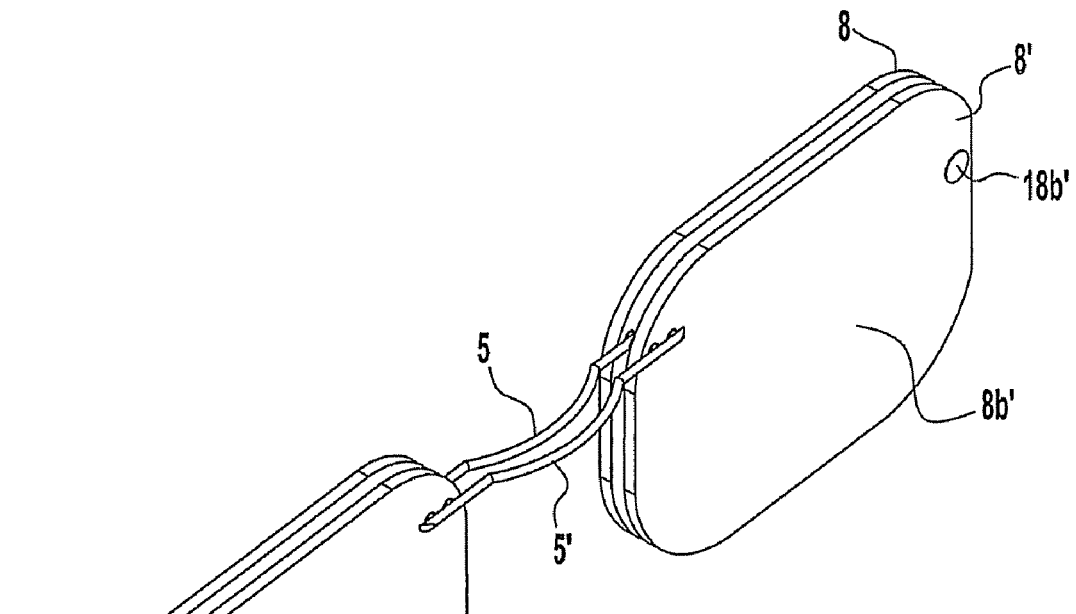
FIG. 14
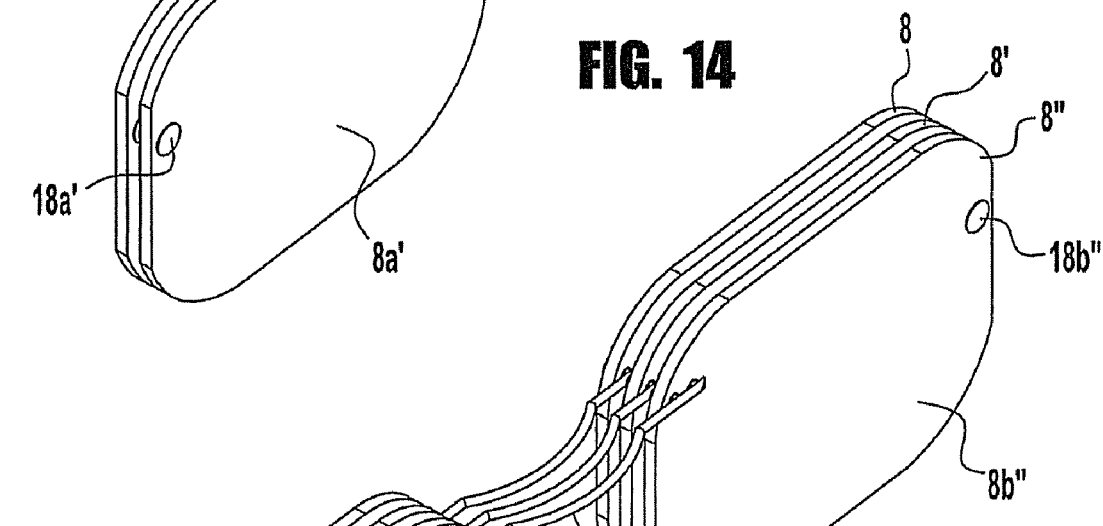
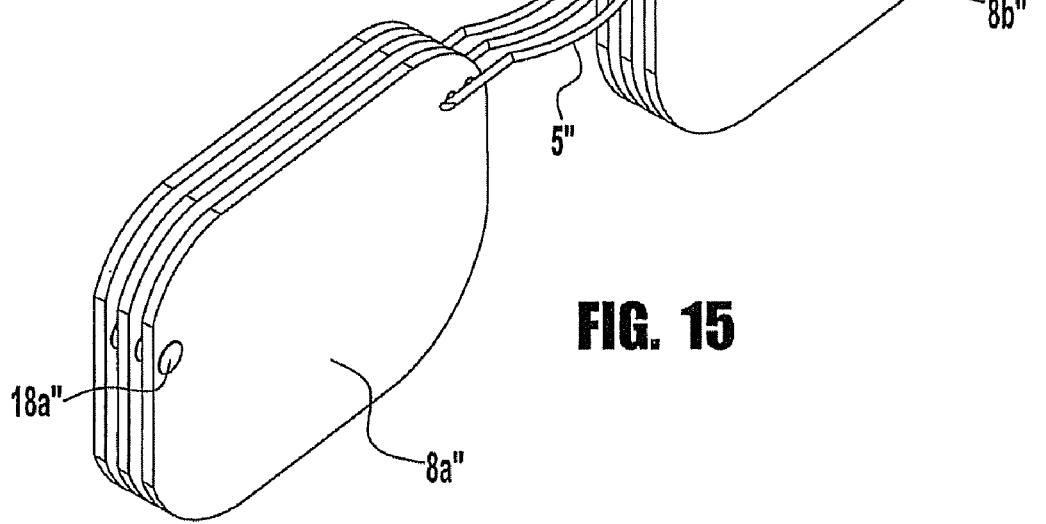
FIG. 15

ATTACHABLE MAGNETIC EYEGLASSES AND METHOD OF MAKING SAME

CROSS REFERENCE

This application claims the benefit of prior U.S. Provisional Application Ser. No. 60/700,171 filed on Jul. 18, 2005 and entitled "Z-Clips—magnetic eyeglass sun-clip and method of making same."

FIELD OF THE INVENTION

The present invention relates to attachable eyewear and, in particular, to attachable supplemental or auxiliary lenses having a magnet for removable attaching to primary eyeglasses.

BACKGROUND OF THE INVENTION

A trend to emerge over the last decade in fashion eyewear and as means to protect a wearer from sunlight has been the advent of a "clip-on" sunglass. Clip-on sunglasses typically consist of auxiliary lenses with clip-like appearances that fit about the frames of the eyeglasses for attaching to eyeglasses such as prescription glasses. The clip-ons may be tinted or otherwise treated and are designed to match indoor prescription eyewear. Traditionally some frame manufacturers have offered clip-ons as an extra accessory, but not all eyeglass frames have corresponding clip-ons. When available the clip-on could be specially ordered for the customer or could be purchased as a set with the frames.

Alternatively, aftermarket clip-ons are available, including slip-ins, flip-ups, fit-overs, fit-behinds, and many variations. Some of these sun clips offer a one-size-fits-all option while others attempt to achieve a better fit by offering several different pre-made shapes to allow the wearer to choose a shape that closely matches the existing frames. Still other alternatives offer a lens grinding and assembly "laboratory service" to produce a customized after-market clip in which the sun lenses themselves are shaped the same as the prescription lenses.

Traditional clips typically have an eye wire or metal ring or rim that encircles the sunglass lenses about the circumference, a browbar that joins each lens together at the eye wire, a connection between the eye wire and browbar, and a connection of appendages to the eye wire. The appendages attach the clip-on lenses to the primary lenses of the prescriptive eyewear, or hold magnets to assist with attachment of the clip-on to the prescriptive lenses. These are constructed using a "browbar" having small "finger-like" appendages to grip the frame of the primary lenses to connect two sun lenses thereto at the circumference. Typically, both hands are required to attach traditional clip-ons to the eyeglass frames.

Magnetic-assisted clips offer another option for attaching clip-on lenses to eyeglasses. Magnetic clip-ons are often bundled with eyeglasses and sold as a set. Some magnetic sun clip-ons rely on appendages to which a small magnet is attached and attracts to a magnet attached on the eyewear frame. When clipped, the appendages overlap and magnetic attraction holds the two pieces together. Other magnetic sun lenses use magnets attached directly to magnets on or in the front face of the eyeglass frame or other parts comprising the frame.

While these designs offer certain advantages in the market, they have certain problems and shortcomings. Eye wires and appendages that attach traditional clip-ons to the eyeglasses add weight to the eyeglasses that can restrict the wearer's movement. Sometimes this weight is enough to cause the clip-on to detach unintentionally.

Further, appendages can potentially scratch the primary lenses when the clip-on is being attached to the primary lenses, such as when the appendages are improperly aligned. In general, clip-ons must be attached to the primary lens at a particular angle-of-attachment, such as by bringing the clip-on to mount bottom side first or top side first. Where clip-ons are attached by magnets, any bending, warping, or misshaping of the clip-on can cause alignment to be lost and detachment to occur. Often, even a slight disfigurement to the eyeglasses, even such as results from normal wear and tear, may cause the clip-on and eyeglasses to lose their symmetry such that the clip-on might not attach at all or only very weakly.

Another limitation of these conventional clip-ons is that they are not aesthetically pleasing to some consumers. They often lack the fine design and construction of some of the more upscale hand-made frames that are available on the market today. Fewer choices are available compared to the vast array of optical frames.

Yet another problem with conventional clip-ons is that they have a tendency to break. For example, the eye wire, browbar, and/or prongs tend to lack durability. This is often problematic because wearers tend to subject these products to a high degree of wear and tear.

Accordingly, there is a need for a supplemental lens that accommodates a variety of eyeglasses, is light weight and less likely to scratch or detach, provides stability, and/or can be customized.

SUMMARY OF THE INVENTION

The present invention is directed towards an attachable supplemental lens unit designed to accommodate any pair of eyeglasses and be combined therewith, and a method for making same. The claimed supplemental lens units are made with a drilled assembly and therefore differ from traditional clip-on lenses. The supplemental lens unit comprises an elongated bridge having two ends, each end having at least one prong. Each prong is designed to accommodate and fit within or pass through corresponding connecting cavities or holes in a supplemental lens. The connecting cavities or holes are positioned near or about the nasal portion of each supplemental lens. The bridge connects the supplemental lenses to each other when the prongs are inserted into nasal holes. Each supplemental lens is generally alignable with a corresponding primary lens. Each supplemental and corresponding primary lens has a peripheral hole or cavity that is generally opposite the nasal portion. There are at least two sets of magnets, each set having at least two magnets of opposite polarity. At least one magnet of each set is positioned within the peripheral hole or cavity in one of each of the supplemental lenses and the other magnet of the set is positioned in the peripheral hole or cavity in the corresponding primary lens. The magnet in each supplemental lens is generally alignable with the magnet in the corresponding primary lens and removably attachable therewith.

Each magnet is aligned with a polarity that runs generally parallel to the direction of light traveling through the lens and perpendicular to the plane of the lens surface. Magnets are positioned within supplemental lenses and generally align with magnets of opposite polarity positioned within primary lenses of an eyeglass frame and provide magnetic attraction for detachably connecting with the magnets of the primary lenses. In an example, supplemental lenses have a shape which generally corresponds with that of the primary lenses so that, when attached, the eyeglasses and supplemental lenses appear as a unit. In another example, supplemental lenses have a unique or different design than the shape of the eyeglass frame. The magnets may be constructed of any shape such as square, triangular, circular, etc. to increase clearance or add fashionability.

In combination, the invention provides eyeglasses and supplemental lenses adapted to be removably mounted thereon. Supplemental lenses are connected by a bridge and have magnetic components for attachment to primary lenses of eyeglasses. In examples, the supplemental lenses are sunglasses, polarized lenses, or corrective or prescriptive lenses that are designed to complement the lenses of the eyeglasses. In another example, supplemental lenses provide a protective layer over primary lenses. Supplemental lens unit may be used with prescription eyeglasses. It may also be used with nonprescription lenses, such as with clear accessory lenses to alter the appearance or color, or to provide protection from ultraviolet (UV) rays (UV-A and UV-B type). Primary lenses may be, for examples, high-index, polycarbonate, regular plastic, glass, polarized or tinted lenses.

In an embodiment, the present invention provides a method of making attachable supplemental lenses using the laboratory service of an optical craftsman or, alternatively, an automated system design.

Accordingly, it is object in an embodiment of the invention to provide attachable sunglasses for use with new eyeglasses or retrofittable to older eyeglasses.

It is another object in an embodiment of the present invention to provide attachable supplemental or auxiliary lenses without the use of clips or overlapping appendages.

It is also an object in an embodiment of the invention to provide a customized attachable sunglass lens wherein the size, color, light-transmittance, and/or prescription of lens and/or the number, shape, and position of magnets, is adjustable.

It is still a further object in an embodiment of the invention to provide attachable supplemental lenses with magnetic mounting for one-handed attachment and removal. The lenses may also give the wearer durability, flexibility, comfort, cost-effectiveness, clarity, and convenience.

It is still a further object in an embodiment of the invention to provide supplemental lenses that provide a protective layer over primary lenses to increase resistance of primary lenses to scratches and other damage.

Those and other advantages and benefits of the present invention will become better understood or apparent from the following drawings showing embodiments thereof, the detailed description of examples of the invention and the appended claims.

BRIEF DESCRIPTION OF THE DRAWINGS

In the drawings which are attached hereto and made a part of this disclosure:

FIG. 3 is a front view of an example of an embodiment of the present invention showing the supplemental lens unit attached to the front surface of the primary lenses of a pair of eyeglasses.

FIG. 4 is a side view of an example of an embodiment of the present invention showing the supplemental lens unit attached to the front surface of the primary lenses of a pair of eyeglasses.

FIG. 5 is a perspective exploded view of an example of an embodiment of the present invention showing how constituent parts of the supplemental lens unit are connected to each other and to the front surface of the primary lenses of a pair of eyeglasses.

FIG. 6 is a top exploded view of an example of an embodiment of the present invention showing how constituent parts of the supplemental lens unit are pieced together and to the front surface of the primary lenses of a pair of eyeglasses.

FIG. 8A shows a perspective view of an example of a magnet used in the lenses of the claimed invention, FIG. 8B shows a side view of an example of a magnet used in the lenses of the claimed invention, and FIG. 8C shows a cross-sectional view of an example of magnets embedded in lenses and attached to each other.

FIG. 9A shows a perspective view of an example of a magnet used in the lenses of the claimed invention, FIG. 9B shows a side view of an example of a magnet used in the lenses of the claimed invention, and FIG. 9C shows a cross-sectional view of an example of magnets embedded in lenses and attached to each other.

FIGS. 10A-10D show cross-sectional views of examples of magnets used in the claimed invention and embedded within lenses.

FIG. 14 is a perspective view of two supplemental lens units stacked together.

FIG. 15 is a perspective view of three supplemental lens units stacked together

DETAILED DESCRIPTION OF EXAMPLES OF EMBODIMENTS OF THE PRESENT INVENTION

Figure 1:
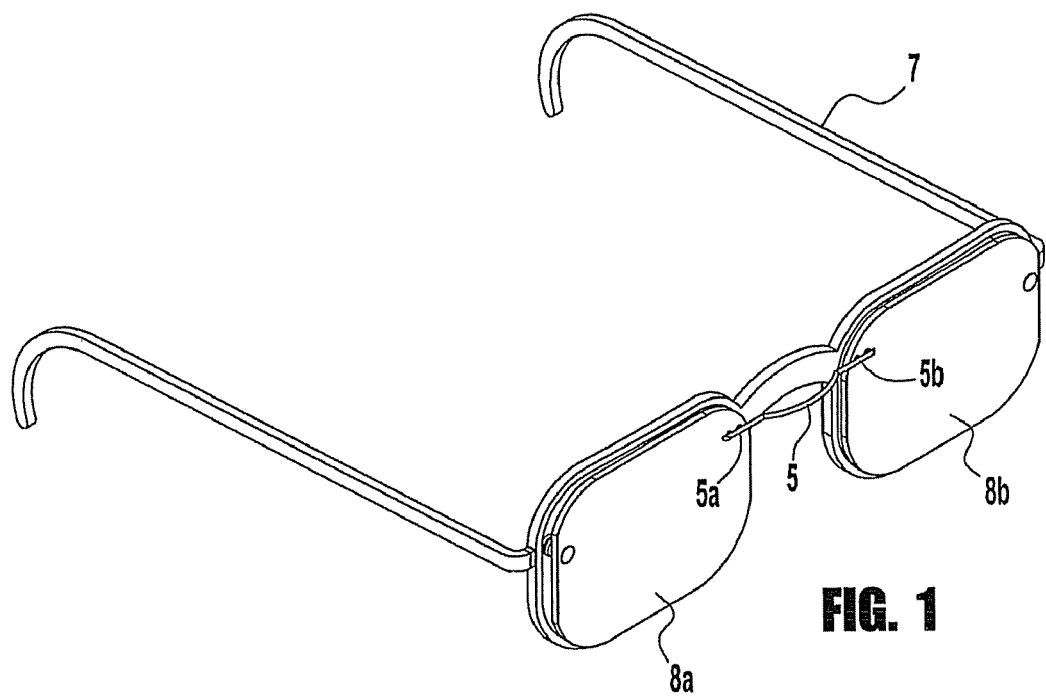
FIG. 1 is a perspective view of an example of an embodiment of the present invention showing the supplemental lens unit attached to the front surface of the primary lenses of a pair of eyeglasses.
Figure 2:
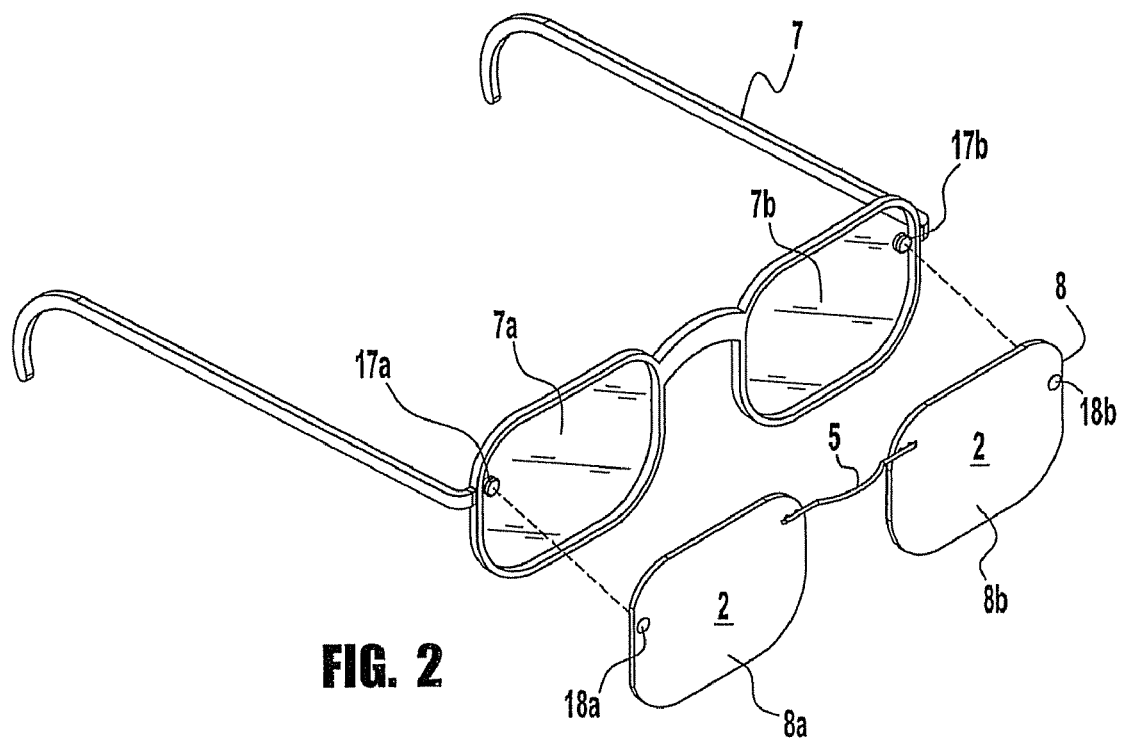
FIG. 2 is a perspective view of an example of an embodiment of the present invention showing the supplemental lens unit detached from the primary lenses of a pair of eyeglasses.

In embodiments, the present invention provides an attachable supplemental lens unit 8 for use on or in combination with a pair of eyeglasses 7, and a method of making same. The invention eliminates the need for rubberized appendages and metal rims that are typical of current clip-on or supplemental lens products. The claimed supplemental lens unit 8 offers a match to fit each frame for which it is crafted, thereby being available to virtually all eyeglasses 7, new or used. Eyeglasses 7 include a frame made of plastic or other conventional material and two primary lenses 7a, 7b. Supplemental lens units 8 may be retrofitted to a wearer's existing eyeglasses 7 or may be manufactured in conjunction with eyeglasses 7.

Supplemental lens units 8 generally self-align with corresponding magnets 17a, 17b in primary lenses 7a, 7b by means of the attraction thereto of magnets 18a, 18b positioned or embedded within supplemental lenses 8a, 8b and can generally be attached using only one hand. Alignment and attachment are generally accomplished without scratching or otherwise damaging primary lenses 7a, 7b because the claimed supplemental lens units 8 do not attach to primary lenses 7a, 7b via metal or rubber appendages.

As shown generally in the figures, and referring particularly to FIGS. 1-4, the attachable supplemental lens unit 8 comprises a pair of supplemental lenses 8a, 8b connected together by an elongated bridge 5 that are removably mounted to primary lenses 7a, 7b of a pair of eyeglasses 7 through use of magnets 17a, 17b, 18a, 18b. Supplemental lenses 8a, 8b may be tinted, mirrored, anti-reflective, clear, polarized, scratch-coated, corrective, cosmetic, protective, or a combination thereof. In examples, supplemental lenses 8a, 8b are made from plastic, polycarbonate, tri-acetate-nylon, high-index plastic, polymers, or vinyl. In a preferred example, supplemental lenses 8a, 8b are polarized polycarbonate wafer lenses having a thickness of about 0.7 to about 1.0 mm. In the examples shown, supplemental lenses 8a, 8b are positioned along bridge 5 to match size and shape of primary lenses 7a, 7b of eyeglasses 7. In other examples (not shown), supplemental lenses 8a, 8b are larger, smaller, and/or have a different shape than primary lenses 7a, 7b to provide a different look or greater coverage. In an example, supplemental lenses 8a, 8b are optionally enlarged approximately 4 mm relative to primary lenses 7a, 7b to overlap primary lenses while still matching the shape and getting the "custom" look.

As shown generally in the figures, each supplemental lens 8a, 8b is generally planar or has a corresponding or matching base curve to the primary lenses 7a, 7b such that the lenses 7a, 7b, 8a, 8b are generally parallel over their entire surface areas. In other examples where supplemental lens 8a, 8b is to serve as a corrective lens, supplemental lens 8a, 8b may have a slight front or back base curvature (not shown). Base curves may range from greater than 0 to 8 as is generally understood in the industry. In examples, base curves may be spherical, spherocylindrical, cylindrical, parabolic, or compound and supplemental lenses derived therefrom may be single vision, bifocal, progressive, trifocal, or reading lenses.

FIGS. 5 and 6 show exploded views of the supplemental lens unit 8 in combination with a pair of eyeglasses 7. Each supplemental lens 8a, 8b has at least two holes or cavities. One hole 26a, 26b in each supplemental lens is located near a nasal portion of the lens and is for insertion of prongs 6a, 6b of elongated bridge 5 to connect supplemental lenses 8a, 8b to each other to form a unitary piece. The other hole 28a, 28b is located near a peripheral portion of the supplemental lens 8a, 8b and is for insertion of magnets 18a, 18b that are attracted to magnets 17a, 17b inserted into corresponding holes 27a, 27b in primary lenses 7a, 7b for removable attachment of supplemental lens unit 8 to eyeglasses 7. As used herein, peripheral is not limited to the extreme edge portion of the lens 7a, 7b, 8a, 8b but is defined to include any area or portion of the body of the lens that is not in the line of vision or that does not interfere with the functionality of the lenses. In the examples shown, peripheral holes 28a, 28b are positioned generally opposite nasal holes 26a, 26b near an edge of the supplemental lenses 8a, 8b. In another example, the holes or cavities 28a, 28b are placed at locations on lenses 8a, 8b other than near the edges, as long as the holes or cavities generally align with corresponding holes or cavities 27a, 27b in primary lenses 7a, 7b (not shown). Placement is limited only by convenience and/or appropriateness of the lenses, frames, and/or desired look or utility specified by the wearer.

Figure 7A:
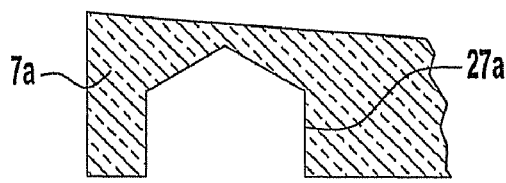
FIGS. 7A-7D show cross-sectional views of examples of cavities for positioning magnets in lenses and FIGS. 7E-7H show top views of examples of cavities.
Figure 7B:
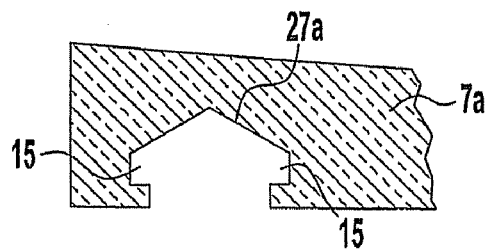
Figure 7C:
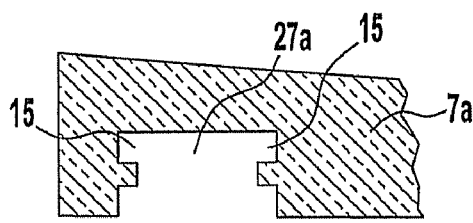
Figure 7D:
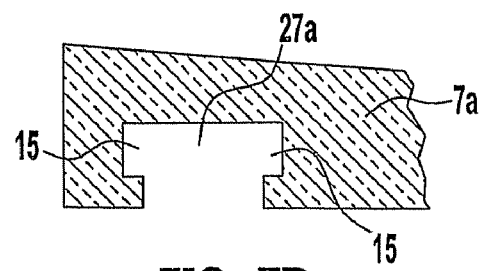
Figure 7E:
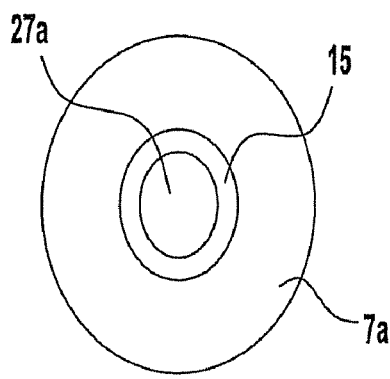
Figure 7F:
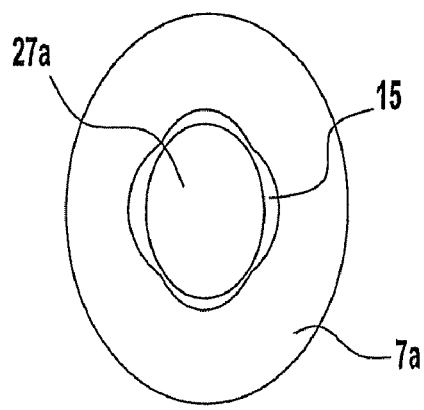
Figure 7G:
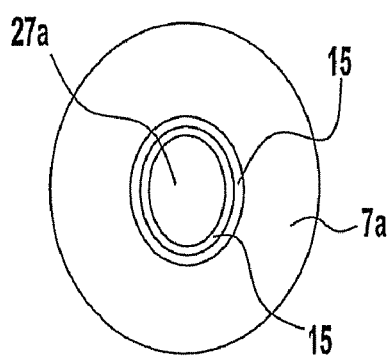
Figure 7H:
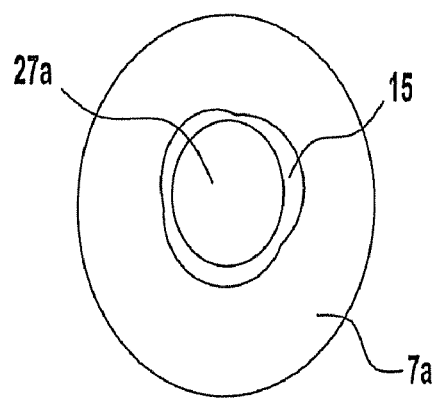

Cavities or holes 27a, 27b, 28a, 28b may be of any size or shape to accommodate corresponding magnet 17a, 17b, 18a, 18b. Examples of shapes of peripheral hole or cavity 27a are shown in FIG. 7 and are discussed in more detail below in conjunction the description of the magnets inserted therein. Although FIG. 7 only shows hole or cavity 27a in primary lens 7a, holes or cavities 27b, 28a, 28b could be generally identically shaped in corresponding lenses 7b, 8a, 8b. Cavities or holes 27a, 27b, 28a, 28b may be routed, drilled, or countersunk and may be any shape that will accommodate magnets to provide a good fit therein. Preferably, holes 27a, 27b, 28a, 28b are slightly smaller than and not exactly the same shape of corresponding magnets 17a, 17b, 18a, 18b for a more secure fit. For example, where magnet 17a, 17b, 18a, 18b is cylindrical, it is preferable to drill or route a hole or cavity that is slightly oblong in order to provide an offset and pressurized fitting. In examples, the circumference of holes 27a, 27b, 28a, 28b is generally about 2.45 mm, with a deviation of about +/−0.05 nm in the second or third cardinal directions. Holes 27a, 27b, 28a, 28b may optionally be made with a specialized drill head to achieve a recessed ledge, notch, or counter-ledge 15 such as the hole shown in FIGS. 7B-7H to correspond to notches and ledges on magnets 17a, 17b, 18a, 18b. Such recessed ledges or notches provide an increased mechanical pressure that snugly embeds magnets 17a, 17b, 18a, 18b within holes 27a, 27b, 28a, 28b of lenses 7a, 7b, 8a, 8b. In an example, recessed notch, ledge, or counter-ledge 15 is substantially symmetrical about inner circumference of hole 27a, 27b, 28a, 28b such as is shown in FIGS. 7E and 7G. In another example, counter-ledge 15 is asymmetrical about the inner circumference of hole 27a, 27b, 28a, 28b as shown in FIGS. 7F and 7H. Further, there may optionally be more than one counter-ledge 15 in hole or cavity 27a, 27b, 28a, 28b, as shown in FIGS. 7C and 7E-7H.

Figure 11:
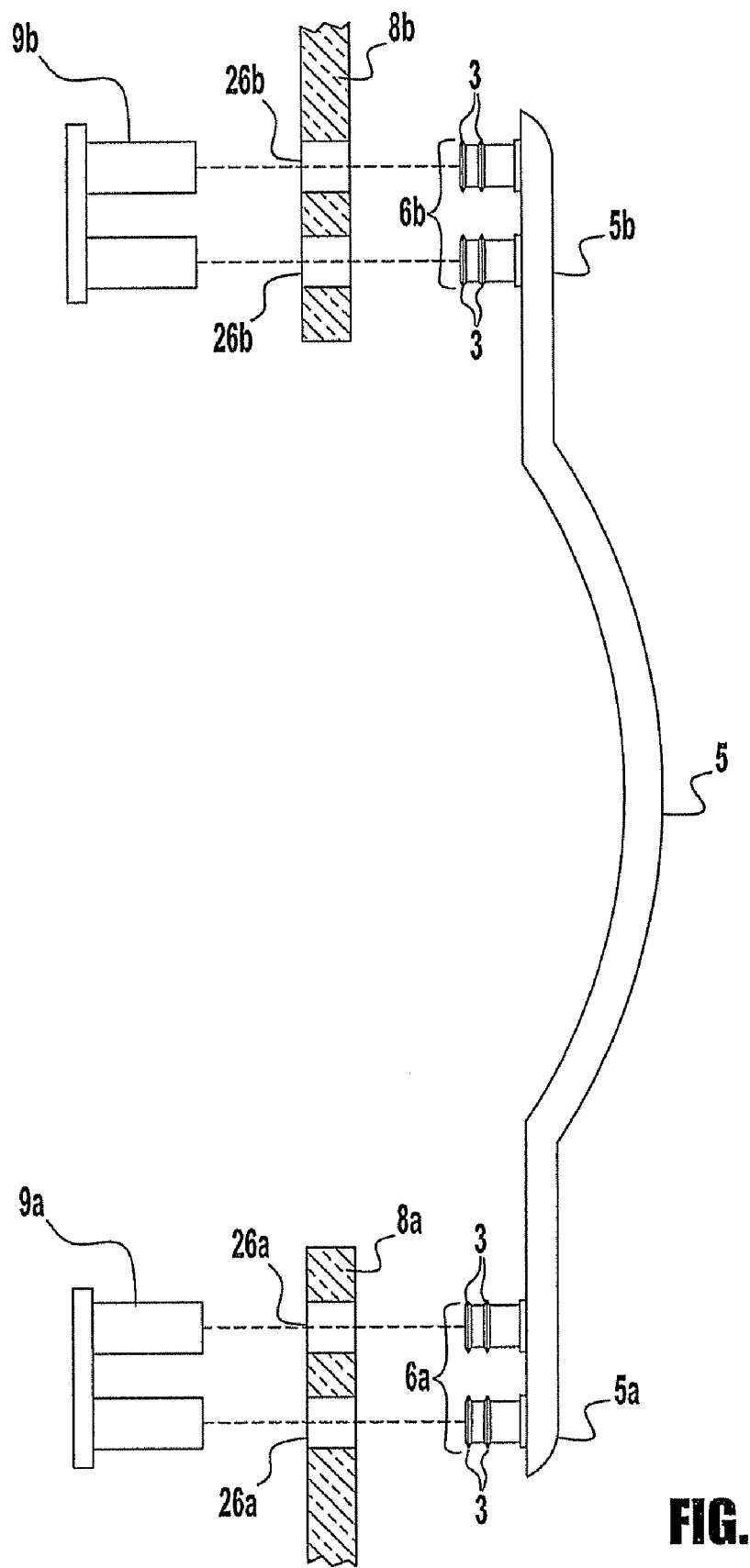
FIG. 11 shows a top exploded view of an example of the bridge comprising the claimed invention.

Nasal cavities or holes 26a, 26b may be of any size or shape to accommodate corresponding prongs 6a, 6b. In an example, holes are cylindrical and are concentric to optional bushing 9a, 9b. Examples of shapes of nasal hole or cavity 26a, 26b are shown in FIG. 11. In general, cavities or holes 26a, 26b are drilled using a standard drilling method or procedure. However, in examples, shapes of nasal hole or cavity may be generally the same as peripheral holes 27a, 27b, 28a, 28b discussed above and may be routed, drilled, or countersunk as described above in order to accommodate any shape of prong 6a, 6b to provide a good fit therein. Preferably, holes 26a, 26b are slightly smaller than and not exactly the same shape of corresponding prongs 6a, 6b for a more secure fit. Holes 26a, 26b may also optionally be made with a specialized drill head to achieve a recessed ledge or notch such as the hole shown in FIG. 7B to correspond to notches and ledges on prongs 6a, 6b (not shown).

As shown in FIGS. 5, 6, and 11, a universal elongated bridge 5 connecting lenses 8a, 8b is preferably mounted with a double drill-hole and pressure seal mounting. Bridge 5 has two ends 5a, 5b. Ends 5a, 5b are designed to have a length, width, and/or shape that adapts to eyeglasses 7 to exhibit a desired appearance. Bridge 5 is made of metal or other conventional material. In a preferred example, bridge 5 is made of titanium. Titanium is preferred because of its durability, high strength to weight ratio, and qualities that minimize skin irritations, corrosion, discoloration, oxidation, breakage, or pitting. Optionally, titanium bridges can be re-used for multiple pairs of customized supplemental lenses.

In an example, bridge 5 rests on the nose of a wearer and has a slight arch to it such as is shown in FIGS. 1, 2, 4-6, and 11-18. In another example, bridge 5 is generally flat as is shown in FIG. 3. In another example, bridge 5 is thin and rectangular in three dimensions (not shown). In another example, ends 5a, 5b are flat on inner and outer sides or, alternatively, have a rounded front, top and bottom, and a flat backing (not shown).

Extending from each of ends 5a, 5b is at least one prong 6a, 6b, respectively. Prongs 6a, 6b extend from the inner side or end of ends 5a, 5b. Prongs 6a, 6b connect to a pair of corresponding supplemental lenses 8a, 8b through respective cavities or holes 26a, 26b in supplemental lenses 8a, 8b. In an example, prongs 6a, 6b of bridge 5 are inserted into nasal holes 26a, 26b in supplemental lenses 8a, 8b. Nasal holes 26a, 26b are designed so that prongs 6a, 6b fit securely inside. Preferably, the width or diameter of holes or cavities 26a, 26b is smaller than that of prongs 6a, 6b. In an example, each of prongs 6a and 6b comprises two prongs as shown in FIG. 11. Optionally, prongs 6a, 6b have at least one cutting edge 3 along the circumference that cuts through the softer material from which lenses 8a, 8b are made so as to exert a pressure that enables prongs 6a, 6b to remain fit within holes. As shown in the example in FIG. 11, prongs 6a, 6b each optionally have two cutting edges 3. In another example, an adhesive is used to secure the fit. In another example, a bushing or pressure mounting sleeve 9 is used to increase mounting pressure. In one example, bushing is unitary or integral with prong (not shown). In another example, bushing 9 extends inwardly from behind the hole or cavity in supplemental lens 8a, 8b. Each bushing 9a, 9b has a size, shape and length that is generally complementary to that of each prong 6a, 6b such that each prong 6a, 6b fits snugly within a corresponding bushing 9a, 9b. In an example where each of prongs 6a, 6b comprises two prongs, bushings 9a, 9b are a single piece as shown in FIG. 11. In another example, bushings 9a, 9b are separate pieces (not shown). The bushings 9a, 9b are made of a flexible material that won't damage the cavity or hole and is preferably softer than metal or the lens material. In examples, the bushings are plastic, polymer, or another conventional material. The cutting edge 3, adhesive, and bushing 9 may each be used alone or in any combination.

Figure 19A:
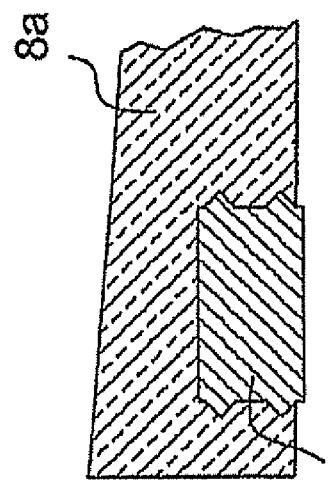
FIGS. 19A-19D show cross-sectional views of examples of magnets used in the claimed invention and embedded within lenses.
Figure 19B:
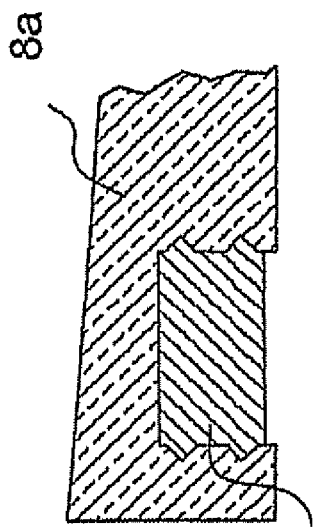
Figure 19C:
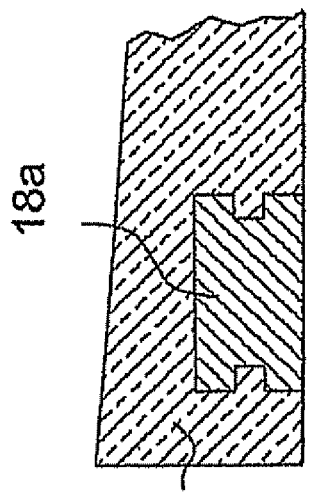
Figure 19D:
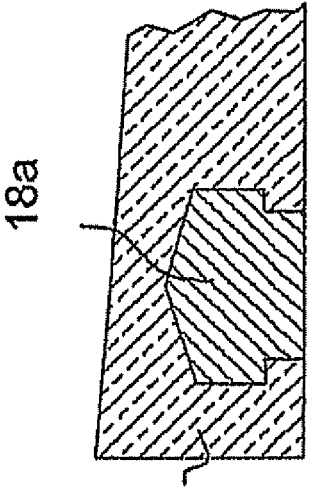

Each lens 7a, 7b, 8a, 8b has at least one magnet 17a, 17b, 18a, 18b positioned within the peripheral cavity or hole 27a, 27b, 28a, 28b therein. Preferably, the majority of the magnet 17a, 17b, 18a, 18b is embedded within the surface of the lens, and more preferably about 80% of the magnet 17a, 17b, 18a, 18b is embedded. In an example, the negative space of cavity or hole 27a, 27b, 28a, 28b is substantially consumed by magnet 17a, 17b, 18a, 18b inserted therein. Magnets 17a, 17b, 18a, 18b, may be entirely embedded within lens 7a, 7b, 8a, 8b such that the attaching surface of the magnet is flush with the lens surface (FIGS. 10A, 10C, 19A, 19C), protrudes or extends slightly above the lens surface (FIGS. 8C, 9C, 1-0B, 19B), or is recessed slightly below the lens surface (FIGS. 10D, 19D). Although FIGS. 8-10, 19 only show the position of magnet 17a within primary lens 7a, it should be noted that magnets 17b, 18a, 18b can also be positioned within corresponding lenses 7b, 8a, 8b as shown generally in the figures. It should also be noted that the examples shown in FIGS. 10 and 19 are for illustration only and that magnets 7a, 7b, 8a, 8b of any shape may be positioned within lens 7a, 7b, 8a, 8b in any of the ways described above and shown in FIGS. 10A-10D, 19A-19D.

Each magnet 17a, 17b, 18a, 18b has a polarity that runs generally parallel to the direction of light traveling through the lenses 7a, 7b, 8a, 8b and perpendicular to the plane of the lens surface. One or more pairs of magnets are used, for example 17a, 18a and 17b, 18b, with one member of each pair being positioned in the hole or cavity 27a, 27b in primary lens 7a, 7b and the other member being positioned in the corresponding hole or cavity 28a, 28b in supplemental lens 8a, 8b, respectively. Magnets 17a, 17b positioned in primary lens 7a, 7b have a polarity opposite to that of corresponding magnet 18a, 18b in supplemental lens 8a, 8b. Magnets can be of any shape, size, color, or optionally may be crystal-studded to add decorative features to lenses (not shown and described in more detail below). Examples of magnets are shown in FIGS. 8-10 and are discussed in detail below.

In preferred examples, magnets 17a, 17b, 18a, 18b are neodymium magnets and range from about 2.0-3.5 mm diameter and a thickness of about 1.6 mm, with a deviation of about 25%. Preferably, magnets 17a, 17b, 18a, 18b do not obstruct the visual field of the wearer. However, magnets may be mounted anywhere on the body of lenses. Multiple pairs may be used to make a creative design with the magnets or to provide greater magnetic attachment strength. Preferably, the magnets 17a, 17b, 18a, 18b have an attractive force of about 0.45 Kj/d, but this force has a deviation of about 25% and may be varied depending upon the intended use of the supplemental lens unit 8 and the weight, size, shape, and general design of the primary lenses 7a, 7b and eyeglasses 7. For example, a weaker magnet may be sufficient for lightweight supplemental lenses. In another example, multiple magnets and/or magnets having greater attractive force may be useful for wearers who are subject to stronger wind speed than normal, such as for those who ride on motorcycles or in convertibles.

Cavities or holes 28a, 28b of lenses 8a, 8b are arranged to correspond with cavities 27a, 27b of primary lenses 7a, 7b thereby placing magnets 17a, 18a and 17b, 18b in the same position and orientation on both the primary lenses 7a, 7b and on the supplemental lenses 8a, 8b. In an example such as the one shown in FIG. 7A cavity or hole 27a, 27b, 28a, 28b is flat and is capable of receiving a magnet having at least one ledge 11a, 11b such as is shown in the examples in FIGS. 8-9. In another example, cavity or hole 27a, 27b, 28a, 28b may have either a recessed notch or a counter-ledge 15 to keep magnet in place more securely. For example, such a counter-ledge 15 may be formed by drilling a cavity in lens with a drill bit that is generally "T-shaped" to form a hole such as the one shown in FIG. 7B and described in more detail above. Other examples of holes having counter-ledge 15 are shown in FIGS. 7C and 7D.

Another important feature in an embodiment of the invention is the design of magnet member. While it is suitable to use magnets that are generally cylindrical, cubical, spherical, or oval, magnets may also have a circumferential indent 10 that forms two ledges, ridges, or beveled edges 11a, 11b between which lens 7a, 7b, 8a, or 8b rests, such as is shown in the examples in FIGS. 8-10. Generally circumferential indent 10 is centrally located between the ledges 11a, 11b of the magnets. However the actual location may vary depending upon the lens 7a, 7b, 8a, 8b with which it is used. Magnets 17a, 17b, 18a, 18b preferably have rounded or beveled edges such as those shown in FIGS. 8, 9 and 10. In another example, a ring or washer is positioned around the part of the magnet that is embedded within lens in order to form a ledge (not shown).

FIGS. 8B and 9B show side view drawings of examples of embodiments of magnets having a circumferential indent 10. In these examples, magnets are about 1.55 mm thick with a circumferential indent 10 that is about one-half the distance between the ledges 11a, 11b, with a deviation of about 25%. Referring particularly to the example shown in FIG. 8B, circumferential indent 10 is positioned between two curved ledges 11a, 11b. In this example, circumferential indent 10 has a length of about 0.45 mm. There are surfaces above 13a or below 13b each curved ledge 11a, 11b (as oriented in FIGS. 8A and 8B) that each have a length of about 0.1 mm. Curved ledge 11a, 11b has a width of about 0.5 mm at its widest points and a height of about 0.225 mm at its highest point. Each dimension provided has a deviation of about 25%.

Referring particularly to the example shown in FIG. 9B, circumferential indent 10 is positioned between two steep ledges 11a, 11b that terminate in peaks. In this example, circumferential indent 10 has a length of about 0.45 mm. There are surfaces above 13a or below 13b each steep ledge 11a, 11b that each have a length of about 0.1 mm. The base of steep ledge 11a, 11b is about 0.5 mm and steep ledge has a height of about 0.225 mm. Each dimension provided has a deviation of about 25%.

Optionally, for added security or fit, ledges can be combined with counter-ledge 15 in the hole, described above. For example, circumferential indent 10 creates a ledge 11a, 11b on magnet. A special drill bit may create a counter-ledge 15 in hole 27a, 27b, 28a, 28b as shown in FIG. 7B and described above to create a cavity that conforms to the circumferential indent 10 on magnet 17a, 17b, 18a, 18b. When magnet is inserted into hole 27a, 27b, 28a, 28b in lens 7a, 7b, 8a, 8b, the ledge 11a, 11b on magnet generally mechanically aligns with and engages counter-ledge 15 in hole or cavity 27a, 27b, 28a, 28b in lens 7a, 7b, 8a, 8b so as to increase the force exerted on magnet 17a, 17b, 18a, 18b and to firmly enclose magnet within hole.

Optionally, magnets may be crystal-studded to add decorative features to lenses. In an example, crystals are thin flat-back crystals that are mounted on a magnet of about 0.5 mm thickness of the same diameter. Cavity is countersunk as described above for magnet to sit therein. Crystal-studded magnets may be interchangeable and may optionally be used on primary lenses alone without the use of supplemental lenses. In examples, crystals are either permanently attached to supplemental lenses 8a, 8b or are attached to thin magnets that mount directly to lenses 7a, 7b, 8a, 8b for removability, interchangeability, and transference between lenses 7a, 7b, 8a, 8b.

Figure 12:
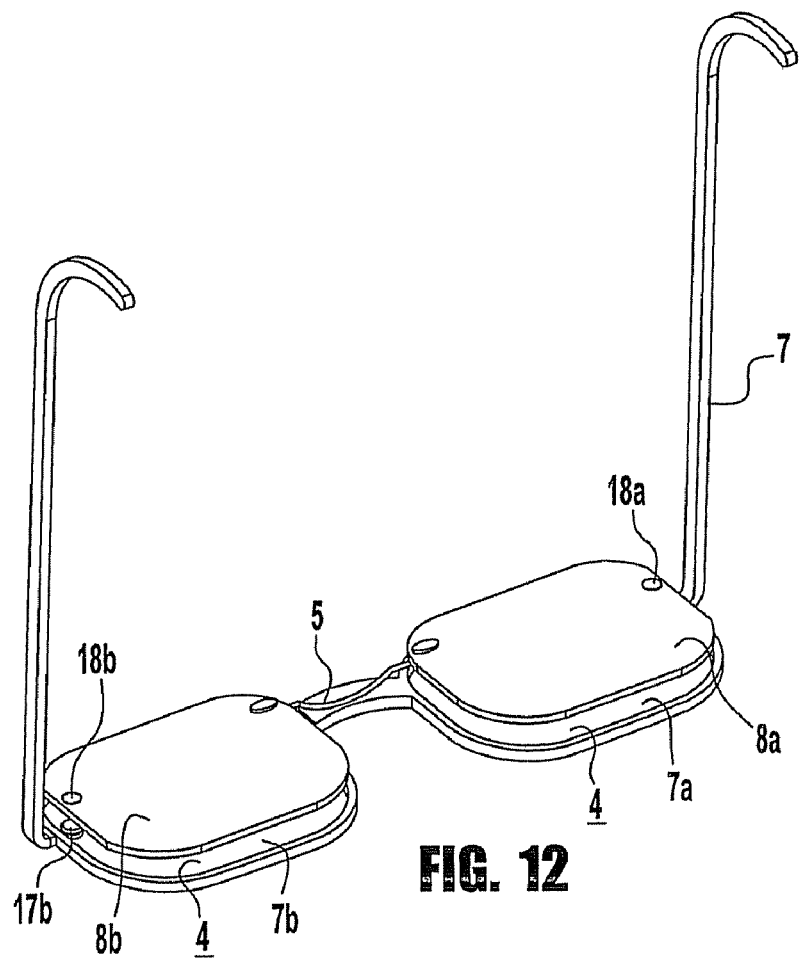
FIG. 12 is a rear perspective view of an example of an embodiment of the present invention showing the supplemental lens unit attached to the rear surface of the primary lenses of a pair of eyeglasses.
Figure 13:
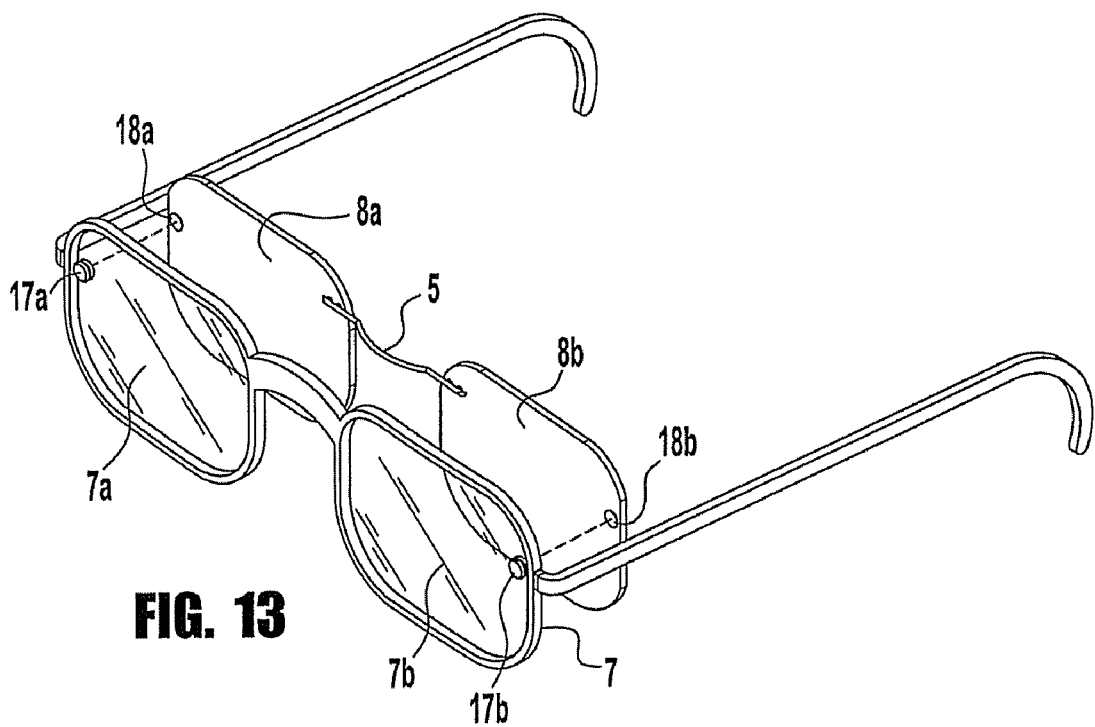
FIG. 13 is a perspective view of an example of an embodiment of the present invention showing the supplemental lens unit detached from the rear surface of the primary lenses of a pair of eyeglasses.
Figure 16:
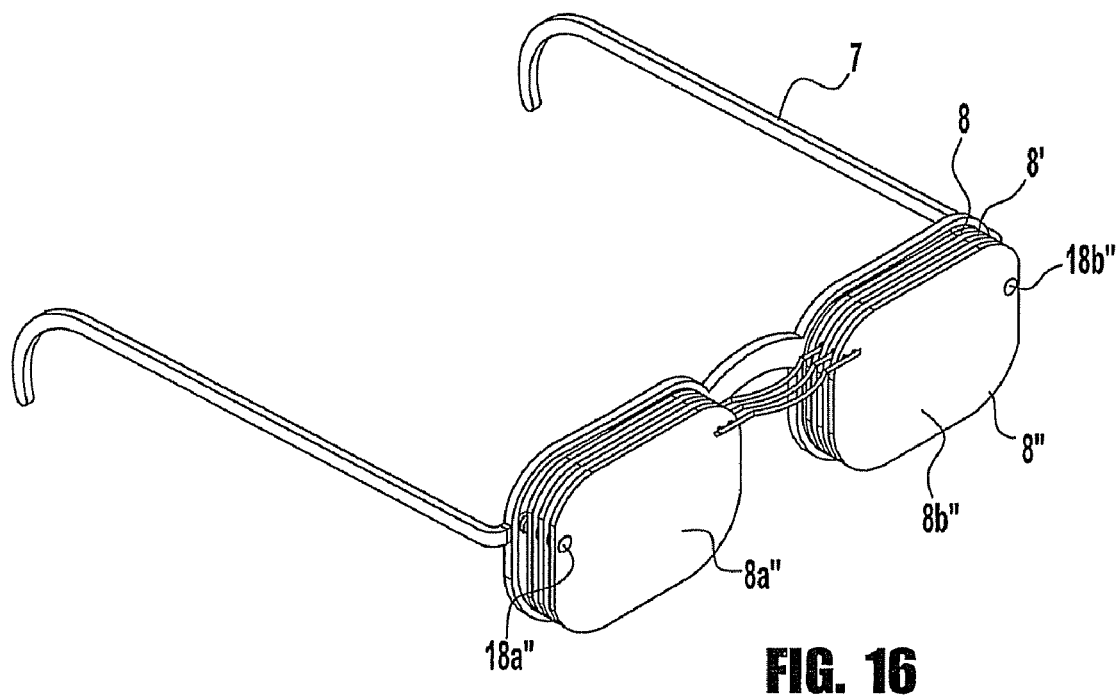
FIG. 16 is a perspective view of three supplemental lens units stacked together and attached to the front surface of the primary lenses of a pair of eyeglasses.

Supplemental lens units may be secured to eyeglasses by magnetically attaching in front of the front surface 2a, 2b of primary lenses 7a, 7b, meaning attaching to the surface of the primary lens that is furthest away from the wearer's face and eyes (FIGS. 1 and 2) or alternatively by magnetically attaching behind the primary lenses, meaning attaching to the rear surface 4a, 4b of the primary lenses 7a, 7b, the one that is closest to the wearer's face and eyes (FIGS. 12 and 13). Attachment behind the primary lenses may be preferable for wearers who are exposed to increased wind speeds, such as those who ride on motorcycles or in convertibles. Although attachment of supplemental lenses 8a, 8b that are corrective may be either in front of or behind primary lenses 7a, 7b, placement in front may offer greater ease of removability and reattachment.

Figure 17:
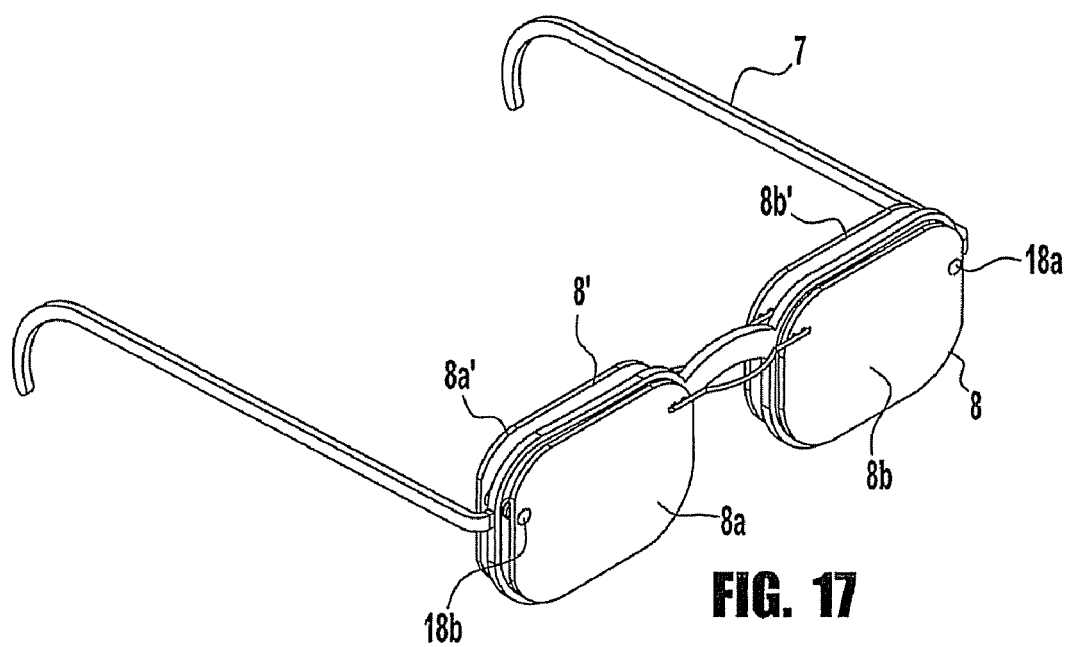
FIG. 17 is a perspective view of supplemental lens units attached to the front and rear surfaces of the primary lenses of a pair of eyeglasses.
Figure 18:
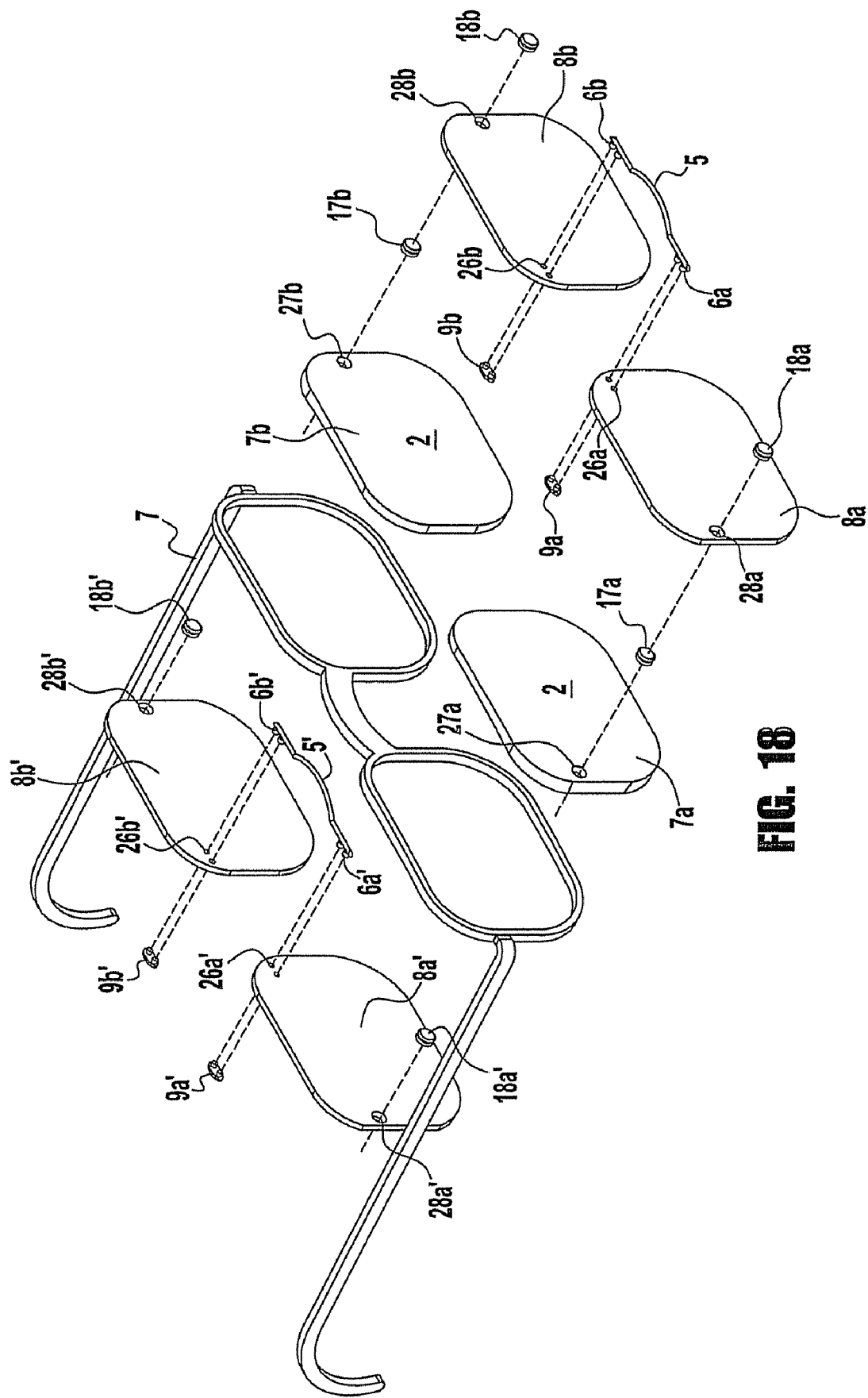
FIG. 18 is a perspective exploded view of an example of an embodiment of the present invention showing how constituent parts of one supplemental lens unit are connected to each other and to the front surface of the primary lenses of a pair of eyeglasses and how constituent parts of a second supplemental lens unit are connected to each other and to the rear surface of the primary lenses.

In an example, multiple supplemental lens units 8, 8', 8" may be stacked together (FIGS. 14 and 15). In examples, stacked supplemental lens units may be used with a single pair of eyeglasses such as by stacking more than one supplemental lens unit on top of each other either in front of (FIG. 16) or behind (not shown) primary lenses, or by attaching at least one supplemental lens unit in front of primary lenses and one behind (FIG. 17). Order of stacking multiple supplemental lenses, for example, one that is corrective and one that is a sunglass, does not matter. In an example, a wearer may prefer to place the less expensive sunglasses 8a', 8b' as the outermost layer in order to provide an additional layer of protection for the more expensive prescription or corrective supplemental lenses 8a, 8b.

In an example, the attachment of component parts in examples where at least one supplemental lens unit 8 is placed in front of primary lens and at least one supplemental lens unit 8' is placed behind is generally the same as described above and is shown in an exploded view in FIG. 18. For example, where primary lenses 7a, 7b are thinner than the thickness of magnets 17a, 17b inserted therein, magnets 17a, 17b extend clear through lenses 7a, 7b such that supplemental lenses 8a, 8b and 8a', 8b' may be mounted in front of and behind primary lenses 7a, 7b using a simple set of magnets 17a, 17b. In another example, second peripheral holes (not shown) must be drilled in the rear surface of the primary lenses 7a, 7b and magnets embedded therein (not shown) in order to provide a mechanism for attaching at least one supplemental lens unit 8' behind primary lenses 7a, 7b. Second magnets on the rear surface of primary lens 7a, 7b may particularly be necessary when lenses 7a, 7b are generally thicker than the thickness of magnets 17a, 17b inserted therein.

In an embodiment, the claimed invention is a method of manufacturing the supplemental lens unit 8 for use in combination with a pair of eyeglasses 7. In a method of making an attachable supplemental lens unit for use with eyeglasses, the invention provides magnetically attaching supplemental lenses 8a, 8b to the primary lenses 7a, 7b of any existent eyewear 7.

In an example, the method of making the supplemental lens unit 8 comprises at least one of the following steps. First, existent eyeglasses 7 and primary lenses 7a, 7b therein are assessed to provide as flush an engagement as possible between primary 7a, 7b and supplemental 8a, 8b lenses. In an example, crafting supplemental lens 8a, 8b with a notch or groove (not shown) allows supplemental lens 8a, 8b to lay flush with primary lens 7a, 7b. Notches are made in supplemental lenses 8a, 8b to cut out or remove portions of the body of the lenses where any part of the body of the frame of eyeglasses 7 extends above the plane of the primary lens 7a, 7b such that it would interfere with the flushness of the fit of the supplemental lens 8a, 8b. The notch permits the supplemental lens 8a, 8b to approach primary lens 7a, 7b without any hindrance, non-clearance, or blockage caused by the body of the frame of eyeglasses 7. In other examples, base curve of supplemental lens 8a, 8b may be adjusted such as by making it flatter or steeper may allow supplemental lens 8a, 8b to lay flush with primary lens 7a, 7b.

Next, primary lenses 7a, 7b are removed from eyeglasses 7. The shape of primary lenses 7a, 7b is traced as generally understood in the industry. Preferably, the primary lenses 7a, 7b are traced after supplemental lenses are ground into the lens blank, but before the lens blank is ground to fit the shape of the supplemental lenses 8a, 8b in order to shape them such that their shape matches that of the primary lenses 7a, 7b. Optionally, a machine with a 'pattern' can be used to grind the shape of the lenses 8a, 8b based on a mechanical plastic dummy lens pattern. In other examples, a "patternless" edger may be used wherein a tracing arm mechanically traces the eye wire shape from the frame and transmits it to the grinder. In either example, a supplemental lens 8a, 8b is produced that matches the pattern or shape of primary lens 7a, 7b. In an example, the resultant size of supplemental lens 8a, 8b is increased by about 4.5 mm. Following tracing, primary lenses 7a, 7b are replaced into eyeglasses.

In a next step, supplemental lenses 8a, 8b are edged to essentially the same shape as primary lenses 7a, 7b. In an example, a flat bevel is used to edge supplemental lenses 8a, 8b. In another example, a machine can be used to upsize a given pattern or shape tracing, symmetrically, thereby maintaining the geometric integrity of the shape. Then, supplemental lenses 8a, 8b are mounted over primary lenses 7a, 7b and secured thereto with blocking pads. The mounting position of magnets 17a, 17b, 18a, 18b and bridge 5 is marked with lenses 7a, 7b, 8a, 8b in place within the frame of eyeglasses 7. Then, the primary lenses 7a, 7b are removed from the eyeglasses 7 with the supplemental lenses 8a, 8b in place. Corresponding lenses 7a, 8a and then 7b, 8b are positioned in lens drill.

Next, holes or cavities 27a, 27b, 28a, 28b having a depth of about 1.6 mm and a diameter of about 2.45 mm are bored into corresponding primary and supplemental lenses 7a, 8a, and 7b, 8b simultaneously to assure a generally aligned magnet placement. Depths and diameters of holes has a deviation of about +/−25%.

Primary lenses 7a, 7b are then removed from the drill. Supplemental lenses 8a, 8b remain in drill alone and bridge holes 26a, 26b each having a diameter of about 1.05 mm to about 1.75 mm, and preferably about 1.4 mm diameter, and positioned about 2.25 mm to about 3.75 mm apart, and preferably about 3.0 mm apart, are drilled in supplemental lenses for insertion of prongs 6a, 6b of bridge 5 therein.

Proper alignment of polarity of magnets should be confirmed prior to inserting magnets into holes. Preferably, nylon pliers are used to insert magnets 17a, 17b, 18a, 18b into holes 27a, 27b, 28a, 28b in order to minimize the likelihood that lenses will become scratched when magnets are inserted into holes therein. Next, primary lenses 7a, 7b are replaced into eyeglasses 7. Then, bridge 5 is attached to each supplemental lens 8a, 8b via nasal holes 26a, 26b. Preferably, both prongs 6a, 6b of bridge 5 are snugly and completely embedded within lens 8a, 8b. In an example, bushing 9a, 9b is inserted into holes 26a, 26b in supplemental lens 8a, 8b, held firmly in place, and then prongs 6a, 6b are inserted into holes 26a, 26b and compressed into lenses 8a, 8b via bushing 9a, 9b.

While various embodiments of devices and methods for making same are described herein, it will be appreciated from the specification that various combinations of elements, variations, equivalents, or improvements therein may be made by those skilled in the art. Thus, it may be almost any shape, form, dimension. The particular models shown and discussed herein have specified length, width, thickness, and secure the lenses via two prongs for illustration purposes. However, the inventive supplemental lenses and lens eyeglass combination could be made in a multitude of shapes or forms. These are all still within the scope of the invention as defined in the appended claims.

What is claimed is:

1. An attachable supplemental lens unit used on or in combination with a pair of eyeglasses having a pair of primary lenses, comprising:
   a. an elongated bridge having two ends and at least two prongs, one prong extending from each of said ends of said bridge in a direction substantially perpendicular to a surface of said bridge;
   b. a pair of supplemental lenses, each supplemental lens having a nasal cavity located near a nasal portion of said supplemental lens and a peripheral cavity in at least one surface located near a periphery of said supplemental lens, the nasal cavity of each of said supplemental lenses being generally aligned with one of said prongs, said bridge connecting said supplemental lenses to each other when said prongs are inserted into said nasal cavities, each of said supplemental lenses being alignable with one of said primary lenses that corresponds thereto; and
   c. at least two sets of magnets, each set having at least two magnets of opposite polarity, at least one magnet of each said set being positioned in said peripheral cavity of one of said supplemental lenses and the other magnet of each said set being positioned in a cavity in one surface of said corresponding primary lens, wherein said cavity in said corresponding primary lens is generally alignable with said peripheral cavity so that said magnets of said pair generally align, said supplemental lens being removably attachable to said corresponding primary lens.

2. The attachable supplemental lens unit as set forth in claim 1 wherein each of said supplemental lenses is at least one of the following:
   a. tinted;
   b. mirrored;
   c. anti-reflective;
   d. clear;
   e. polarized;
   f. scratch-coated;
   g. corrective;
   h. cosmetic; or
   i. protective.

3. The attachable supplemental lens unit as set forth in claim 1 wherein said supplemental lenses are made from a material selected from the group consisting of plastic, polycarbonate, polymer, tri-acetate-nylon, high-index plastic, and vinyl.

4. The attachable supplemental lens unit as set forth in claim 1 wherein each said supplemental lens has a size or shape that is generally complementary to a size or shape of said corresponding primary lens.

5. The attachable supplemental lens unit as set forth in claim 4 wherein said size of each said supplemental lens is enlarged relative to said size of said corresponding primary lens.

6. The attachable supplemental lens unit as set forth in claim 1 wherein said peripheral cavity of each of said supplemental lenses has a recessed notch or counter-ledge that generally complements and engages a circumferential ledge on said magnet inserted therein.

7. The attachable supplemental lens unit as set forth in claim 1 wherein said bridge has at least two sets of prongs and said nasal cavity of each said supplemental lens comprises two cavities designed to securely accommodate said at least two sets of prongs.

8. The attachable supplemental lens unit as set forth in claim 1 wherein said bridge has a flat backing along a surface of each said end.

9. The attachable supplemental lens unit as set forth in claim 1 wherein said bridge further comprises a bushing that engages each said prong to further secure said bridge to said supplemental lenses.

10. The attachable supplemental lens unit as set forth in claim 1 wherein one of said magnets of each said pair is embedded in at least one surface of one of said supplemental lenses in one of the following arrangements:
   a. an attaching surface of said magnet is flush with said surface of said supplemental lens in which said magnet is embedded;
   b. an attaching surface of said magnets protrudes beyond said surface of said supplemental lens in which apart of said magnet is embedded; or
   c. an attaching surface of said magnets recessed from said surface of said supplemental lens in which said magnet is embedded.

11. The attachable supplemental lens unit as set forth in claim 1 wherein said polarities of said magnets run in a direction that is generally parallel to a direction of light traveling through said lenses and generally perpendicular to a plane of a lens surface.

12. The attachable supplemental lens unit as set forth in claim 1 further comprising at least one decorative crystal.

13. The attachable supplemental lens unit as set forth in claim 1 wherein said supplemental lenses are attached to said primary lenses of said eyeglasses in one of the following arrangements:
   a. each said supplemental lens is attached to a front surface of said corresponding primary lens; or
   b. each said supplemental lens is attached to a rear surface of said corresponding primary lens.

14. The attachable supplemental lens unit as set forth in claim 1 further comprising a second pair of supplemental lenses, each member of said second pair of supplemental lenses having a magnet positioned in a second peripheral cavity that is generally alignable with a magnet of opposite polarity positioned in a second cavity in said at least one surface of said corresponding primary lens.

15. The attachable supplemental lens unit as set forth in claim 1 wherein said second peripheral cavity is in each supplemental lens is an opposite surface of said primary lenses from said first peripheral cavity.

16. The attachable supplemental lens unit as set forth in claim 1 further comprising a second pair of supplemental lenses, each member of said second pair of supplemental lenses having a second peripheral cavity and at least one second set of magnets, each member of said second set of magnets being positioned in one of said second peripheral cavities.

17. The attachable supplemental lens unit as set forth in claim 1 wherein at least one of said nasal or peripheral cavities extends through at least one of the supplemental lenses.

18. The attachable supplemental lens unit as set forth in claim 1 wherein at least one of said nasal or peripheral cavities extends through at least one of the primary lenses.

19. The attachable supplemental lens unit as set forth in claim 1 wherein one of said magnets of each said pair is embedded in at least one surface of one of said primary lenses in one of the following arrangements:
   a. an attaching surface of said magnet is flush with said surface of said primary lens in which said magnet is embedded;
   b. an attaching surface of said magnets protrudes beyond said surface of said primary lens in which apart of said magnet is embedded; or
   c. an attaching surface of said magnets recessed from said surface of said primary lens in which said magnet is embedded.

20. An attachable supplemental lens comprising:
   a lens configured to mate with a primary lens, and
   a first magnet embedded in a peripheral cavity in at least one surface of said lens, said first magnet having a polarity that is opposite to a polarity of a second magnet embedded in a peripheral cavity in one surface of said primary lens, said first magnet being oriented to substantially align with said second magnet when said lens and said primary lens are mated.

21. The attachable supplemental lens as set forth in claim 20 further comprising an elongated bridge that is configured to attach said lens to a second lens.

22. The attachable supplemental lens as set forth in claim 21 wherein said bridge comprises two ends and at least two prongs, one prong extending from each of said ends in a direction substantially perpendicular to said surface of one of said lenses, each said prong being adapted for insertion into a nasal cavity in one of said lenses.

23. The attachable supplemental lens as set forth in claim 20 wherein said peripheral cavity in at least one surface of said lens extends through said lens.

24. The attachable supplemental lens as set forth in claim 20 wherein said peripheral cavity in said surface of said primary lens extends through said primary lens.

25. The attachable supplemental lens as set forth in claim 20 wherein a diameter of each said peripheral cavity is smaller than a diameter of said magnet embedded therein.

26. In a pair of eyeglasses comprising a frame and two primary lenses, the improvement therein being a supplemental lens unit comprising a pair of supplemental lenses connected together by an elongated bridge positioned therebetween, said bridge having at least two prongs extending in a direction perpendicular to a surface of said bridge, one of said prongs being inserted into a cavity located near a nasal portion of one of said supplemental lenses and the other of said prongs being inserted into a cavity located near a nasal portion of the other of said supplemental lenses, each supplemental lenses being detachably secured to a corresponding one of said primary lenses by a set of magnets, said members of said set of magnets having opposite polarities, one member of said set of magnets being positioned in a peripheral cavity in at least one surface of said supplemental lens and said other member being positioned in a cavity in one surface of said corresponding primary lens, said peripheral cavities in said supplemental lens and said corresponding lens being generally alignable, said members of said set of magnets being removably attachable.

27. A method of manufacturing an attachable supplemental lens unit, said method comprising at least one of the following steps:
   a. assessing a pair of eyeglasses comprised of first and second primary lenses to provide a substantially flush engagement of each of said first and second primary lenses with a corresponding first and second supplemental lens;
   b. tracing a shape of each of said primary lenses;
   c. grinding or edging a shape of each of said supplemental lenses that is generally complementary to said shape of each said corresponding primary lens;
   d. aligning each supplemental lens over said corresponding primary lens;
   e. marking on each supplemental lens a position of a nasal cavity and a peripheral cavity;

f. marking on each primary lens a position of a peripheral cavity;
g. in each supplemental lens, drilling or boring each said nasal cavity such that said nasal cavity extends through at least two surfaces of said supplemental lens and drilling or boring each said peripheral cavity in at least one surface of each said supplemental lens;
h. in each primary lens, drilling or boring each said peripheral cavity in one surface of each said primary lens;
i. inserting or positioning a magnet into said peripheral cavities; and
j. assembling said supplemental lens unit by inserting each said prong into one of said nasal cavities.

* * * * *

UNITED STATES PATENT AND TRADEMARK OFFICE
CERTIFICATE OF CORRECTION

PATENT NO. : 7,600,870 B2  Page 1 of 1
APPLICATION NO. : 11/458239
DATED : October 13, 2009
INVENTOR(S) : Zelazowski It is certified that error appears in the above-identified patent and that said Letters Patent is hereby corrected as shown below:

Column 13, line 41, for the claim reference numeral "15", that portion of the claim reading "claim 1" should be changed to --claim 14--.

Signed and Sealed this

Sixteenth Day of February, 2010

David J. Kappos
*Director of the United States Patent and Trademark Office*